United States Patent [19]

Howell

[11] Patent Number: 4,700,003
[45] Date of Patent: Oct. 13, 1987

[54] ORTHO NITROANILINES AND A PROCESS FOR THEIR PRODUCTION

[75] Inventor: Frederick H. Howell, Atherton, England

[73] Assignee: Ciba-Geigy Corporation, Ardsley, N.Y.

[21] Appl. No.: 810,471

[22] Filed: Dec. 18, 1985

[30] Foreign Application Priority Data

Dec. 20, 1984 [GB] United Kingdom ............... 8432187

[51] Int. Cl.$^4$ .................... C07C 76/02; C07C 79/09; C07C 79/10; C07C 87/50
[52] U.S. Cl. ................................................. 564/441
[58] Field of Search ......................................... 564/441

[56] References Cited

U.S. PATENT DOCUMENTS

| | | | |
|---|---|---|---|
| 3,686,230 | 8/1972 | Maravetz | 564/441 X |
| 3,775,402 | 11/1973 | Maravetz | 564/441 X |
| 3,780,046 | 12/1973 | Maravetz | 260/294.8 F |
| 3,784,574 | 1/1974 | Maravetz | 564/441 X |
| 4,310,693 | 1/1982 | Fujita et al. | 564/441 X |

OTHER PUBLICATIONS

Waters Reference Formula Index, p. 1875, (1935).
Chem. Abstract 30, 1782$^6$ (1936).

Primary Examiner—Paul F. Shaver
Attorney, Agent, or Firm—Luther A. R. Hall

[57] ABSTRACT

New compounds having the formula I are described:

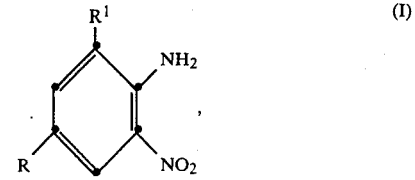

wherein R and $R^1$, independently are H, halogen, a straight- or branched-chain alkyl having 1 to 8 carbon atoms or a residue having the formula II:

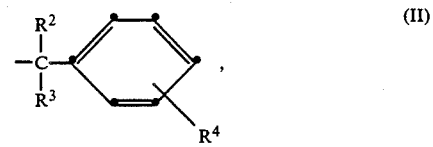

wherein $R^2$ and $R^3$ are the same or different and each is H or straight- or branched-chain alkyl having 1 to 4 carbon atoms and $R^4$ is H, halogen or straight- or branched-chain alkyl having 1 to 4 carbon atoms; provided that at least one of R and $R^1$ is a residue of formula II, and that when R is a residue of formula II wherein $R^2$, $R^3$, and $R^4$ and H, $R^1$ may not be ethyl or n-propyl.

Processes for producing the new compounds are also disclosed.

Compounds of formula I are useful as intermediates for valuable dispersion dyestuffs.

9 Claims, No Drawings

ORTHO NITROANILINES AND A PROCESS FOR THEIR PRODUCTION

The present invention relates to new chemical compounds, especially new ortho nitroanilines and to a process for their production.

In U.S. Pat. No. 3,780,046 are disclosed in table II 4-Benzyl-6-ethyl- and 4-Benzyl-6-n-propyl-2-nitroaniline, which are useful as herbicides.

The present invention provides compounds having the formula I

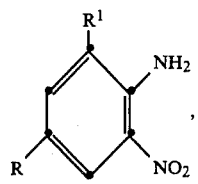

wherein R and $R^1$, independently are H, halogen, a straight- or branched-chain alkyl having 1 to 8 carbon atoms or a residue having the formula II

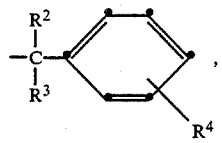

wherein $R^2$ and $R^3$ are the same or different and each is H or straight- or branched-chain alkyl having 1 to 4 carbon atoms and $R^4$ is H, halogen or straight- or branched-chain alkyl having 1 to 4 carbon atoms; provided that at least one of R and $R^1$ is a residue of formula II, and that when R is a residue of formula II wherein $R^2$, $R^3$, and $R^4$ are H, $R^1$ may not be ethyl or n-propyl.

When R or $R^1$ is a $C_1$-$C_8$alkyl group it may be, e.g., methyl, ethyl, n-propyl, iso-propyl, n-butyl, iso-butyl, t-butyl, t-pentyl or 1,1,3,3-tetramethylbutyl.

Halogen groups R or $R^1$ or $R^4$ may be fluorine, bromine or iodine but are preferably chlorine.

When $R^2$ and/or $R^3$ and/or $R^4$ is a $C_1$-$C_4$ alkyl group, each may be e.g., methyl, ethyl, n-propyl, iso-propyl, n-butyl or t-butyl.

Preferred compounds of formula I are those wherein R and $R^1$ have their previous significance except that only one of R and $R^1$ is a residue of formula II, as hereinbefore defined. Especially preferred compounds of formula I are those wherein R is a residue of formula II and and $R^1$ is H. More especially preferred are compounds of formula I wherein $R^1$ is H, and R is a residue of formula II in which at least one of $R^2$ and $R^3$ is methyl. Most especially preferred are compounds of formula I wherein $R^1$ is H, R is a residue of formula II in which at least one of $R^2$ and $R^3$ is methyl and $R^4$ is H or $C_1$–$C_4$-alkyl, especially H or methyl.

Substituent $R^4$ is preferably in para position to the —C($R^2$)($R^3$)—group in the residue of formula II.

Non-limiting examples of new compounds of formula I include: 4-Benzyl-2-nitro-aniline, 6-Benzyl-2-nitro-aniline, 4-(α-Methyl- benzyl)-2-nitro-aniline, 6-(α-Methyl-benzyl)-2-nitro-aniline, 4-(α-Ethyl-benzyl)-2-nitro-aniline, 6-(α-Ethyl-benzyl)-2-nitro- aniline, 4-Cumyl-2-nitro-aniline, 4-(4-Methyl-α-methyl-benzyl)-2-nitro-aniline, 6-(4-Methyl-α-methyl-benzyl)-2-nitro-aniline, 4-(4-iso-Propyl-α,α-dimethyl-benzyl)-2-nitro-aniline, 4-(2-Chloro-αmethyl-benzyl)-2-nitro-aniline, 6-(2-Chloro-α-methyl-benzyl)-2-nitro-aniline, 4-(3-Chloro-α-methyl-benzyl)-2-nitro-aniline, 6-3-Chloro-α-methyl-benzyl)-2-nitro-aniline, 4-(4-Chloro-α-methyl- benzyl)-2-nitro-aniline, 6-(4-Chloro-α-methyl-benzyl)-2-nitro-aniline, 4-(4-Chloro-α,α-di-methyl-benzyl)-2-nitro-aniline, 6Benzyl-4-methyl-2-nitro-aniline, 6-Methyl-4-(α-methyl-benzyl)-2-nitro-aniline, 4-Methyl-6-(α-methyl-benzyl)-2-nitro-aniline, 6-(α-Ethyl-benzyl)-4-methyl-2-nitro-aniline, 4-Cumyl-6-methyl2-nitro-aniline, 4-Methyl-6-(4-methyl-α-methyl-benzyl)-2-nitro-aniline, 6-Methyl-4-(4-isopropyl-α,α-di-methyl-benzyl)-2-nitro-aniline, 6-(2-Chloro-α-methyl-benzyl)-4-methyl-2-nitro-aniline, 6-(3-Chloro-α-methyl-benzyl)-4-methyl-2-nitro-aniline, 6-(4Chloro-α-methyl-benzyl)-4-methyl-2-nitro-aniline, 4-(4-Chloro-α,αdimethyl-benzyl)-6-methyl-2-nitro-aniline, 6-Benzyl-4-t-bu- tyl-2-nitro-aniline, 4-t-Butyl-6-(α-methyl-benzyl)-2-nitro-aniline, 4-t-Butyl-6-(α-ethyl-benzyl)-2-nitro-aniline, 4-t-butyl-6-(4-methyl-α-methyl-benzyl)-2-nitro-aniline, 4-t-Butyl-6-(2-chloro-α-methyl-benzyl)-2-nitro-aniline, 4-t-Butyl-6-(3-chloro-α-methyl-benzyl)-2-nitro-aniline, 4-t-Butyl-6-(4-chloro-α-methyl-benzyl)-2-nitro-aniline 6-(α-Methyl-benzyl)-4-(1,1,3,3-tetramethylbutyl)-2-nitro-aniline, 6-(4-Methyl-α-methyl-benzyl)-4-(1,1,3,3-tetramethylbutyl)-2-nitro-aniline, 6-(4-Chloro-α-methyl-benzyl)-4-(1,1,3,3-tetramethylbutyl)-2-nitro-aniline, 4-Chloro-6-benzyl-2-nitro-aniline, 4-Chloro-6-(α-methyl-benzyl)-2-nitro-aniline, 4-Chloro-6-(α-ethyl-benzyl)-2-nitro-aniline, 4-Chloro-6-(4-methyl-α-methyl-benzyl)-2-nitro-aniline, 4-Chloro-6-(4-chloro-α-methyl-benzyl)-2-nitro-aniline, 4,6-Di-benzyl-2-nitro-aniline, 4,6-Bis-(α-methyl-benzyl)-2-nitro-aniline, 4,6-Bis-(α-ethyl-benzyl)-2-nitro-aniline, 4,6-Bis-(4-methyl-αmethyl-benzyl)-2-nitro-aniline, 4,6-Bis-(4-chloro -α-methyl-benzyl)-2-nitro-aniline, 4-Cumyl-6-(αmethyl-benzyl)-2-nitro-aniline, 6-(4-Chloro-α-methyl-benzyl)-4-(4-methyl-α-methyl-benzyl)-2-nitroaniline.

The compounds of formula I are preferably prepared by aralkylation methods known in the art. Typically an o-nitroaniline is reacted at elevated temperature and in the presence of an aqueous acidic catalyst with an aralkylating agent capable of introducing one or two residues of formula II into the molecule. The conditions under which the reaction is carried out are controlled to give the desired degree of aralkylation.

For instance, the compounds of formula I may be prepared by reacting one mole of an o-nitroaniline of formula III

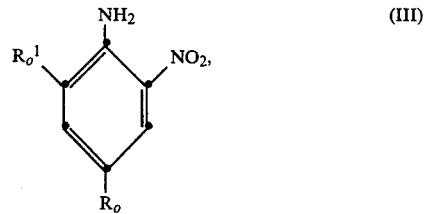

wherein $R_o$ and $R_o^1$ are either each hydrogen or only one is hydrogen and the other is straight- or branched chain alkyl having 1 to 8 carbon atoms or halogen, with up to 1 mole or at least 2 mole of an aralkylating agent capable of introducing 1 or 2 residues of formula II, as hereinbefore defined, into the benzene ring of the nitro-aniline of formula III, at a position ortho- and/or para to the amino group.

Alternatively, when it is desired to introduce two identical residues II to give compounds of formula I wherein R and $R^1$ are the same residue of formula II, 1 mole of o-nitroaniline may be reacted with at least two moles of an aralkylating agent, as hereinbefore defined.

The aralkylation process can be carried out in two steps such that compounds already aralkylated with one residue of formula II may be subjected to a further aralkylation step to introduce another residue of formula II which may be the same or different. In this second step the compounds of formula I may be produced by reacting 1 mole of an o-nitroaniline of formula III wherein one of $R_o$ is H and the other is a residue of formula II as hereinbefore defined, with at least one mole of an aralkylating agent, as hereinbefore defined.

The aralkylation reactions are conveniently effected at elevated temperature, in an aqueous acid medium generally containing at least 30% by weight, of water, based on the acid used. The molar proportions of o-nitroaniline III to aralkylating agent may vary within the range of from 10:1 to 1:3 respectively and, when an excess of o-nitroaniline III is used, this excess may be recovered, e.g. by distillation, and recycled into the reaction mixture.

The presence of this substantial amount of water, relative to acid, ensures that the reaction mixture forms a homogenous solution. Conveniently the acid used is commercially-available concentrated hydrochloric acid (36% weight/weight) and in which case the amount of water which is present is 64% by weight relative to the acid.

The aralkylation reactions in the aqueous medium, are preferably effected in the presence of a metal salt as cocatalyst and at atmospheric pressure, optionally in the presence of an inert organic solvent, preferably acetic acid.

The aralkylating agents contain a reactive centre e.g. an olefinic, hydroxy, amino, halogen, acetoxy or ether group, which is eliminated, transformed or re-arranged during the course of the aralkylation process.

Clearly, relative to the total reaction mixture, large excesses of water are to be avoided in the interests of output and efficiency from a given reactor volume.

The aralkylation reactions are effected at an elevated temperature e.g. in the range of from 50° to 200° C., more conveniently from 100° to 150° C. When temperatures above 110° C. are used, then superatmospheric pressures may be applied in a suitable reaction vessel e.g. a sealed glass reactor or an acidresistant pressure vessel such as a tantalum-lined steel reactor. Any superatmospheric pressure used is preferably one below 100 bar.

The acid catalyst which is used may be inorganic or organic or a partial salt thereof. Examples of such acids are hydrochloric-, sulphuric- and orthophosphoric acids; and alkyl-, aryl- and alk- aryl-substituted inorganic acids e.g. methane- or ethane sulphonic acids, benzene sulphonic acid, p-toluene sulphonic acid, methane phosphoric acid, dichloroacetic acid, trichloroacetic acid, trifluoroacetic acid or perfluorinated resin sulfonic acids e.g. Nafion H © (Dupont). The molar proportion of acid catalyst present in the aralkylation reaction mixture per mole of o-nitroaniline (III) is preferably between 0.25 to 1.0 moles.

The aralkylation reactions are suitably carried out in the presence of a co-catalyst which is a metal salt, -oxide, -hydroxide or -carbonate wherein the metal belongs to Group II, III or VIII of the Periodic Table of Elements. Such metals are preferably Mg, Cd, Zn, Al, Fe, Co or Ni. The metal salt may be e.g. a halide, sulphate or phosphate. If a metal carbonate, oxide or hydroxide is used as a co-catalyst, then sufficient acid, over and above that required to catalyse the aralkylation, should be present in order to form the metal salt.

The metal salt is usually present in a concentration of up to 0.5 mole per mole of o-nitroaniline III. A suitable co-catalyst is $ZnCl_2$.

After completion of the aralkylation, the o-nitroaniline so aralkylated may be freed from the acid/metal salt complex by treatment with a base e.g. an alkali metal hydroxide, -carbonate or -bicarbonate or ammonium hydroxide.

Specific examples of o-nitroanilines III useful as starting materials in the aralkylation process for producing compounds of formula I include: 2-nitroaniline, 4-methyl-2-nitro-aniline, 6-methyl-2-nitro-aniline, 4-ethyl-2-nitro-aniline, 4-n-propyl-2-nitro-aniline, 4-iso-propyl-2-nitro-aniline, 4-n-butyl-2-nitro-aniline, 4-sec-butyl-2-nitroaniline, 4-t-butyl-2-nitro-aniline, 4-n-octyl-2-nitro-aniline, 4-(1,1,3,3-tetra-methyl-butyl)-2-nitro-aniline, 4-chloro-2-nitroaniline, 6-chloro-2-nitro-aniline.

The aralkylating agent may be an aryl substituted olefin, aralkyl alcohol, aralkyl-alkyl ether, aralkylamine, aralkyl halide or aralkyl acetate which is capable of introducing a residue of formula II into the benzene nucleus of o-nitroaniline (III).

In an alternative process, the aralkylation reactions may be conducted in the presence of an acid catalyst as before, but in a non-aqueous medium, that is in the melt or in the presence of an organic solvent, preferably acetic acid, which is inert under the aralkylation reaction conditions. The non-aqueous reaction is conveniently effected at an elevated temperature, preferably a temperature within the range 100 to 200, especially 150°–175° C.

Specific examples of such aralkylating agents include: Benzyl alcohol, Benzyl methyl ether, Benzyl chloride, Benzyl acetate, Benzylamine, 2-Chlorobenzyl alcohol, 3-Chlorobenzyl alcohol, 4-Chlorobenzyl alcohol, 2-Methylbenzyl alcohol, 3-Methylbenzyl alcohol, 4-Methylbenzyl alcohol, α-Methyl benzyl alcohol, α-Methyl benzyl amine, Styrene, 2-Methyl-styrene, 3-Methyl-styrene, 4-Methyl-styrene, 2-Chloro-styrene, 3-Chloro-styrene, 4-Chloro-styrene, α-Methylstyrene, cumyl alcohol, cumyl acetate, β-Methyl styrene, Allyl benzene, 4-Chloro-α-methylstyrene, 4-Chloro-cumyl alcohol, 4-iso-Propyl-α-methylstyrene, or mixtures thereof.

The new compounds of formula I are useful as intermediates for new dispersion dyes which, in turn, are useful for dyeing polyester fibres. The new dispersion dyes have the formula IV

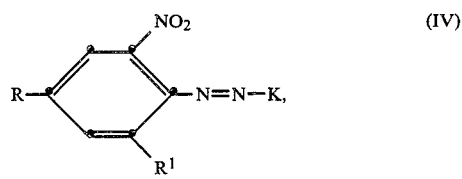

wherein R and $R^1$ have their previous significance and K is a carbocyclic or, preferably, a heterocyclic coupling component, especially a pyridone.

The compounds of formula IV are prepared by diazotising compounds of formula I and coupling them with a coupling component under reaction conditions well-known in the dyestuffs art.

The following Examples further illustrate the present invention. Parts and percentages shown therein are by weight unless otherwise stated.

EXAMPLE 1

To 20.4 parts of 36% w/w hydrochloric acid in which had previously been dissolved 13.4 parts of anhydrous zinc chloride is added 27.6 parts of o-nitroaniline. This mixture is heated to reflux temperature and during the next hour 23.6 parts of α-methylstyrene are added dropwise with stirring. After completing the addition the reaction mixture is stirred and refluxed for further 2 hours before being poured whilst still hot into a solution of 50 parts sodium hydroxide in 100 parts of water. This mixture after stirring for 15 minutes is set aside to cool, whereupon the upper organic phase solidified. The solid cake is then broken up, filtered off, washed with water, dried, and crystallised from ethanol to give 4-cumyl-2-nitro-aniline as orange crystals m.p. 92°–4° C. with the following percentage composition by weight.

|  | Carbon | Hydrogen | Nitrogen |
|---|---|---|---|
| Found | 70.17 | 6.46 | 10.81 |
| Calculated for $C_{15}H_{16}N_2O_2$ | 70.29 | 6.29 | 10.93 |

EXAMPLE 2

To 20.4 parts of 36% w/w hydrochloric acid in which had previously been dissolved 13.4 parts of anhydrous zinc chloride are added 27.6 parts of o-nitro-aniline and 10.8 parts of benzyl alcohol. This mixture is stirred under reflux temperature for 6 hours and then poured into a hot solution of 50 parts of sodium hydroxide in 100 parts of water. After allowing the decomposed reaction mixtures to cool the organic phase is extracted with ether, and the ether solution washed with water, the ether evaporated and the residue distilled to give a fraction with boiling point 192°–8° C. at 0.4 millibars. This fraction after dilution with 40°–60° petroleum ether containing a little ether yields 4-benzyl-2-nitro-aniline m.p. 80°–3° C.

|  | Carbon | Hydrogen | Nitrogen |
|---|---|---|---|
| Found | 68.12 | 5.34 | 12.24 |
| Calculated for $C_{13}H_{12}N_2O_2$ | 68.41 | 5.30 | 12.27 |

The mother liquors from the above crystallisstion are evaporated and the residual oil after chromatography on a column of silica give, on elution with 40°–60° petroleum ether containing 5% ether, 6-benzyl-2-nitro-aniline m.p. 90°–3° C.

|  | Carbon | Hydrogen | Nitrogen |
|---|---|---|---|
| Found | 68.42 | 5.30 | 12.18 |
| Calculated for $C_{13}H_{12}N_2O_2$ | 68.41 | 5.30 | 12.27 |

EXAMPLE 3

Example 2 is repeated using 10.4 parts of styrene in place of the benzyl alcohol. Distillation of the reaction product gives a fraction boiling at 194°–8° C. at 0.4 millibars. Dilution of this fraction with 60°–80° petroleum-ether containing a little ether gives 4-(α-methyl-benzyl)-2-nitro-aniline m.p. 96°–8° C.

|  | Carbon | Hydrogen | Nitrogen |
|---|---|---|---|
| Found | 69.75 | 5.97 | 11.61 |
| Calculated for $C_{14}H_{14}N_2O_2$ | 69.41 | 5.82 | 11.56 |

The mother liquors from the crystallisation are evaporated and the residual oil after chromatography on a column of silica give, on elution with 40°–60° petroleum-ether containing 5% ether, 6-(α-methyl-benzyl)-2-nitro-aniline m.p. 70°–3° C.

|  | Carbon | Hydrogen | Nitrogen |
|---|---|---|---|
| Found | 69.54 | 6.04 | 11.37 |
| Calculated for $C_{14}H_{14}N_2O_2$ | 69.41 | 5.82 | 11.56 |

EXAMPLE 4

Example 3 is repeated using 20.8 parts of styrene instead of 10.4 parts. Distillation of the reaction product gives a fraction b.p. 188°–218° C. at 0.4 millibars which contained 4- and 6-(α-methyl-benzyl)-2-nitro-aniline, and then a fraction b.p. 218°–74° C. at 0.4 millibars.

The later fraction after chromatography on a silica column gives 4,6-bis-(α-methyl-benzyl)-2-nitro-aniline as an oil, b.p. 220° C. at 0.4 mb (short-path distillation).

|  | Carbon | Hydrogen | Nitrogen |
|---|---|---|---|
| Found | 76.61 | 6.65 | 8.13 |
| Calculated for $C_{22}H_{22}N_2O_2$ | 76.28 | 6.40 | 8.09 |

EXAMPLES 5 to 17

The compounds summarised in the following Table were prepared by the metho described in Example 1.

| Example No. | Starting materials/ reaction conditions | Product | b.p. °C. pressure (mb) | m.p. °C. | Found and required % composition C | H | N |
|---|---|---|---|---|---|---|---|
| 5 | 27.6 parts o-nitro-aniline, 11.8 parts β-methylstyrene, 20 hours reflux | 4-(α-ethylbenzyl)-2-nitroaniline | 196–202 0.5 mb | 83–5 | 70.25 70.29 | 6.40 6.29 | 10.67 10.93 |
| 6 | 27.6 parts o-nitro aniline, 11.8 parts 4-methylstyrene, 4.5 hours at reflux | 4-(4-methyl-α-methyl-benzyl)-2-nitro-aniline | 190–220 0.5 mb | 92–5 | 70.53 70.29 | 6.32 6.29 | 10.78 10.93 |
| 7 | 27.6 parts o-nitro-aniline, 19.2 parts | 4-(4-ispropyl)-α,α-dimethylbenzyl)-2- | 220 0.5 mb | 109–11 | 72.86 72.45 | 7.48 7.43 | 9.36 9.39 |

| Example No. | Starting materials/ reaction conditions | Product | b.p. °C. pressure (mb) | m.p. °C. | C | H | N |
|---|---|---|---|---|---|---|---|
| | p-isopropenyl-isopropylbenzene, 6 hours at reflux | nitro-aniline | | | | | |
| 8 | 27.6 parts o-nitro aniline, 13.8 parts 2-chlorostyrene, 4.5 hours at reflux | 4-(2-chloro-α-methyl-benzyl)-2-nitro-aniline | 198–200 0.7 mb | 97–100 | 61.02 60.76 | 4.77 4.73 | 10.03 10.12 |
| 9 | 27.6 parts o-nitro-aniline, 13.8 parts 4-chlorostyrene, 4.5 hours at reflux | 4-(4-chloro-α-methyl-benzyl)-2-nitro-aniline | 207–12 0.5 mb | 122–5 | 61.03 60.76 | 4.67 4.73 | 9.98 10.12 |
| 10 | 27.6 parts o-nitro-aniline, 30.5 parts 4-chloro-α-methyl-styrene 3 hours at reflux | 4-(4-chloro-α,α-dimethyl-benzyl)-2-nitro-aniline | 212 0.5 mb | 83–5 | 62.08 61.96 | 5.29 5.20 | 9.67 9.64 |
| 11 | 30.4 parts 4-methyl-2-nitro-aniline, 20.8 parts styrene, 6 hours at reflux | 4-methyl-6-(-α-methyl-benzyl)-2-nitro-aniline | 200 0.5 mb | 107–9 | 70.42 70.29 | 6.33 6.29 | 10.79 10.93 |
| 12 | 30.4 parts 4-methyl-2-nitro-aniline, 11.8 parts β-methyl-styrene, 20 hours at reflux | 6-(α-ethyl-benzyl)-4-methyl-2-nitro-aniline | 206 0.5 mb | 107–110 | 71.45 71.09 | 6.76 6.71 | 10.18 10.36 |
| 13 | 30.4 parts 6-methyl-2-nitro-aniline, 23.6 parts α-methyl-styrene, 20 hours at reflux | 6-methyl-4-(α,α-dimethyl-benzyl)-2-nitro-aniline | | 119–21 | 70.75 71.09 | 6.73 6.71 | 9.95 10.36 |
| 14 | 30.4 parts 4-methyl-2-nitro-aniline, 11.8 parts 4-methyl-styrene, 4.5 hours at reflux | 4-methyl-6-(4-methyl-α-methyl-benzyl)-2-nitro-aniline | 190–210 0.5 mb | 150–3 | 71.20 71.09 | 6.72 6.71 | 10.21 10.36 |
| 15 | 30.4 parts 4-methyl-2-nitro-aniline, 13.9 parts 4-chloro-styrene, 4.5 hours at reflux | 6-(4-chloro-α-methyl-benzyl)-4-methyl-2-nitro-aniline | 209–11 0.7 mb | 120–3 | 61.90 61.96 | 5.24 5.20 | 9.51 9.64 |
| 16 | 34.5 parts 4-chloro-2-nitro-aniline, 20.8 parts styrene, 6 hours at reflux | 4-chloro-6-(α-methyl-benzyl)-2-nitro-aniline | 190–220 0.7 mb | 93–5 | 60.69 60.76 | 4.95 4.73 | 9.85 10.13 |
| 17 | 30.4 parts 4-methyl-2-nitro-aniline, 13.9 parts 2-chloro-styrene, 4.5 hours at reflux | 6-(2-chloro-α-methyl-benzyl)-4-methyl-2-nitro-aniline | 196 0.5 mb | 100–3 | 62.11 61.96 | 5.25 5.20 | 9.64 9.64 |

Examples 5–17 are all carried out with the addition of 20.4 parts 36% w/w aqueous HCl and 13.6 parts of ZnCl$_2$.

EXAMPLE 18

12.8 parts of 4-cumyl-2-nitro-aniline (prepared according to Example 1 are dissolved in 85 parts by volume of glacial acetic acid and 15 parts by volume of propionic acid, the solution is treated with 12.5 parts by volume of 32% hydrochloric acid, cooled to 0° C. and diazotised with 12.5 parts by volume of 4N sodium nitrite solution, at 0°–5° C. with ice cooling within 10 minutes, and then stirred for further 45 minutes at 0 to 5° C. The diazonium salt solution is then added dropwise, over about 20 minutes, into a solution of 9.4 parts of the pyridone of formula:

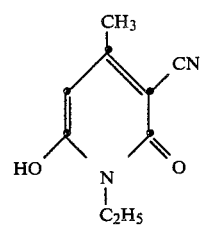

in 200 parts by volume of water and 5 parts by volume of 30% sodium hydroxide solution, with cooling at 0°–10° C., while holding the pH value at 4 using dilute aqueous ammonia. After further stirring for 1 hour at 10° C. (max) the dyestuff is separated, washed free from excess coupler using dilute ammonia and then washed neutral with water and dried at 80° C. in vacuum. 20.7 parts (93% of theory) are obtained of the dyestuff

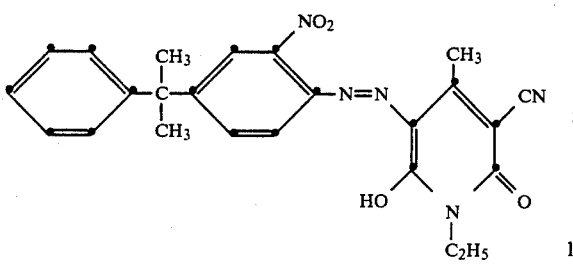

as an orange-yellow powder which, after sintering at 180° C., melts between 213° and 216° C.

After two recrystallisations from ethyl acetate, the melting point was raised to 221°–222° C. (sintering at 216° C.).

EXAMPLE 19

To 510 parts of 36% w/w hydrochloric acid containing 170 parts of anhydrous zinc chloride, are added 690 parts of o-nitroaniline. This mixture is heated to reflux temperature and, over the next hour, 708 parts of α-methylstyrene are added with stirring. On completing the addition, the reaction mixture is maintained at reflux for a further one and a half hours before being poured, whilst still hot, into a solution of 600 g sodium hydroxide in 1400 parts of water. The mixture is stirred until cool and then 1500 parts of ether are added and the resulting two phases are passed through a fibre filter to remove a small quantity of suspended solids. The filtrate is transferred to a separator and the lower aqueous phase is run off and discarded. The organic phase is washed with 2×500 parts of water, dried over magnesium sulphate, treated with decolouring charcoal and filtered. The filtrate is concentrated on a steam-bath until the residue weighed approximately 2000 parts. It is diluted with 2000 parts of 40°–60° C. petroleum-ether and set aside to crystallise overnight. The product following filtration is suspended in 1500 parts of 40°–60° petroleum-ether, stirred for 1 hour, and filtered to yield 4-cumyl-2-nitroaniline as an orange crystalline solid with a m.p. 92°–3° C. and a purity of 100% by G.L.C. analysis.

EXAMPLE 20

13.8 parts of 2-nitroaniline, 14.2 parts of α-methylstyrene, 10.2 parts of 36% w/w hydrochloric acid, 25 parts of water, and 30 parts of glacial acetic acid are refluxed for 8 hours and then poured into an excess of 10% sodium hydroxide solution. The organic phase is isolated with ether and distilled to give a fraction $b_{1.5}$ 190°–210° C which had an 86.4% content of 4-cumyl-2-nitroaniline as determined by G.L.C. analysis.

EXAMPLE 21

55.2 parts of o-nitroaniline, 28.3 parts of α-methylstyrene and 3.8 parts of p-toluene sulphonic acid monohydrate are stirred and heated at 175° C. for 15 minutes and then 28.3 parts of α-methylstyrene are added dropwise over 15 minutes. On completion of the addition, heating at 175° C. is continued for a further 30 minutes before the reaction mixture is cooled and treated with 200 parts of 1N sodium hydroxide solution. The organic phase, after isolation with ether, is distilled to give a fraction $b_{0.5}$ 200°–10° C. containing 97.5% 4-cumyl-2-nitroaniline as determined by G.L.C. analysis.

I claim:

1. A compound having the formula

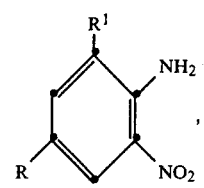

wherein

R and $R^1$, independently are H, halogen, a straight- or branched-chain alkyl having 1 to 8 carbon atoms, or a residue having the formula II

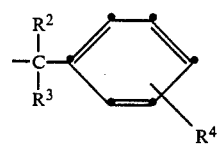

wherein $R^2$ and $R^3$ are the same or different and each is H or straight- or branched-chain alkyl having 1 to 4 carbon atoms and $R^4$ is H, halogen or straight- or branched-chain alkyl having 1 to 4 carbon atoms; provided that at least one of R and $R^1$ is a residue of formula II, and that when R is a residue of formula II wherein $R^2$, $R^3$ and $R^4$ are H, $R^1$ may not be ethyl opr n-propyl, and with the further proviso that when R is benzyl, $R^1$ may not by hydrogen or bromo.

2. A compound according to claim 1 wherein R and $R^1$ are as defined in claim 1 provided that only one of R and $R^1$ is a residue of formula II as defined in claim 1.

3. A compound according to claim 2 wherein R is a residue of formula II and $R^1$ is H.

4. A compound according to claim 3 wherein $R^1$ is H and R is a residue of formula II wherein at least one of $R^2$ and $R^3$ is methyl.

5. A compound according to claim 4 wherein in $R^1$ is H, and R is a residue of formula II in which at least one of $R^2$ and $R^3$ is methyl and $R^4$ is H or $C_1$-$C_4$alkyl.

6. A compound according to claim 5 wherein $R^1$ and R are as defined in claim 5 and $R^4$ is H or methyl.

7. A compound according to claim 1 wherein $R^4$ is in para-postion to the —C($R_2$)$R_3$)—group.

8. A compound according to claim 1, which is 4-cumyl-2-nitro-aniline.

9. A process for the production of a compound of formula I

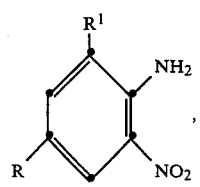

wherein

R and $R^1$, independently are H, halogen, a straight- or branched-chain alkyl having 1 to 8 carbon atoms or a residue having the formula II

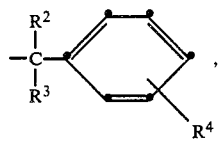

(II)

wherein $R^2$ and $R^3$ are the same or different and each is H or straight- or branched-chain alkyl having 1 to 4 carbon atoms and $R^4$ is H, halogen or straight-or branched-chain alkyl having 1 to 4 carbon atoms; provided that at least one of R and $R^1$ is a residue of formula II, which comprises aralkylating in a molar equivalent ratio one mole of an o-nitroaniline of formula III

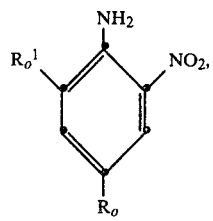

(III)

wherein $R_o$ and $R_o^1$ are either each hydrogen or only one is hydrogen and the other is straight- or branched chain alkyl having 1 to 8 carbon atoms or halogen, with up to 1 mole or at least 2 mole of an aralkylating agent, which is an aryl substituted olefin, an aralkyl alcohol, an aralkyl-alkyl ether, an aralkylamine, an aralkyl halide or an aralkyl acetate, and which agent is capable of introducing 1 or 2 residues of formula II, as hereinbefore defined, into the benzene ring of the o-nitroaniline of formula III, at a position ortho to, para to or both ortho and para to the amino group.

* * * * *